United States Patent
Agrawal

(10) Patent No.: US 7,973,818 B2
(45) Date of Patent: Jul. 5, 2011

(54) MIXING BACKGROUND EFFECTS WITH REAL COMMUNICATION DATA TO ENHANCE PERSONAL COMMUNICATIONS

(75) Inventor: Kapil Agrawal, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1360 days.

(21) Appl. No.: 11/504,129

(22) Filed: Aug. 14, 2006

(65) Prior Publication Data

US 2008/0044035 A1 Feb. 21, 2008

(51) Int. Cl.
*H04N 7/14* (2006.01)
(52) U.S. Cl. ............. 348/14.01; 348/14.02; 455/550.01; 455/556.1
(58) Field of Classification Search .... 348/14.01–14.16; 455/567, 412.2, 569.1, 436, 442, 570, 219, 455/221; 375/240.08; 382/173, 118
See application file for complete search history.

(56) References Cited

U.S. PATENT DOCUMENTS

| | | | |
|---|---|---|---|
| 5,870,675 A * | 2/1999 | Tuutijarvi et al. | 455/436 |
| 6,917,675 B2 * | 7/2005 | Lazarus et al. | 379/202.01 |
| 7,400,905 B1 * | 7/2008 | Malkin et al. | 455/556.1 |
| 2001/0031650 A1 * | 10/2001 | Baiker et al. | 455/570 |
| 2003/0058939 A1 * | 3/2003 | Lee et al. | 375/240.08 |
| 2005/0059434 A1 * | 3/2005 | Hong | 455/567 |
| 2005/0282552 A1 * | 12/2005 | Hatalkar et al. | 455/450 |
| 2006/0069572 A1 * | 3/2006 | Komata | 704/275 |
| 2006/0105818 A1 * | 5/2006 | Andert et al. | 455/569.1 |

FOREIGN PATENT DOCUMENTS

JP 2001060993 A * 3/2001

OTHER PUBLICATIONS

Lee; Method and System for Providing Background sound in a telephone call; Jul. 29, 2004; WO2004/064360A1.*

* cited by examiner

*Primary Examiner* — Melur Ramakrishnaiah
(74) *Attorney, Agent, or Firm* — Farjami & Farjami LLP

(57) ABSTRACT

There is provided a communication device for mixing effects data with real communication data. The communication device comprises a receiving element configured to receive real communication data, a first analog-to-digital converter (ADC) configured to convert real communication data to digitized real communication data, an effects data storage containing the effects data, a first mixer configured to mix the digitized real communication data with the effects data and generate first enhanced data, and a coder configured to packetize the first enhanced data to generate packetized data, and transmit the packetized data over a communication line. The communication device may be a phone, and the real communication data may be audio or video data, and the effects data maybe background effects audio or video data.

2 Claims, 5 Drawing Sheets

MIXING BACKGROUND EFFECTS WITH REAL COMMUNICATION DATA TO ENHANCE PERSONAL COMMUNICATIONS

BACKGROUND OF THE INVENTION

1. Field of the Invention

The present invention relates generally to methods and systems for enhancing personal communications. More particularly, the present invention relates to methods and systems for mixing background effects with real communication data.

2. Background Art

Today, mobile communication devices have become an integral part of the daily life. As an example, cell phones have given people a newfound mobility that allows them to conduct their business on the go. Although this newfound mobility offers many advantages, any cell phone user would attest to the fact that moving from one location to another can affect clarity of cell phone communications due to changes in the background noise, in addition to the loss of privacy that follows the changes in the background noise, which can reveal the user's location. For example, as the cell phone user moves from the office environment to attend a meeting, the background noise continues to change from office noise to elevator noise, car noise, traffic noise, background conversation noise, etc. This continuous change in background noise not only affects the user and listening party's clarity of communication, but also it is an intrusion into the user's privacy who may not wish his location or travel path to be recognized or made known to the listening party.

Similar to audio communications, a video communication device user may also wish to obstruct his background view during video communication for privacy or aesthetic reasons. However, existing communication devices offer no choice to the users who do not wish to reveal their locations or background environment, other than the alternative of limiting the users to placing the calls from fixed locations, which alternative, of course, takes away from the key advantage of the mobility advantage that is offered by mobile communication devices.

Accordingly, there is a need in the art for systems and methods that can overcome the above drawbacks of the existing communication devices, and that can further enhance personal communications, as described below.

SUMMARY OF THE INVENTION

There are provided systems and methods for enhancing personal communications, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
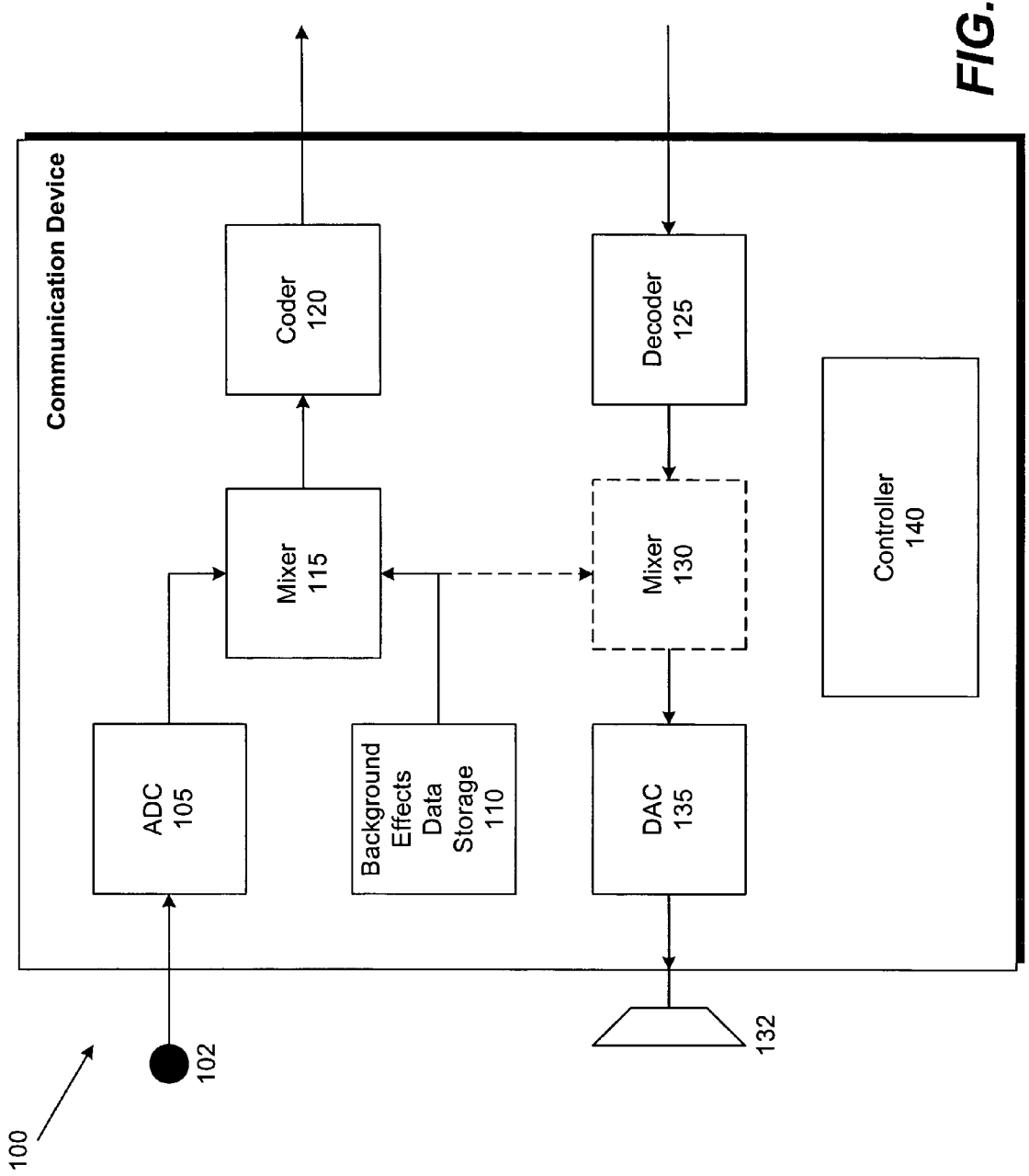
FIG. 1 is a block diagram illustrating various components of a communication device, according to one embodiment of the present invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 is a block diagram illustrating various components of communication device 100, such as a phone, according to one embodiment of the present invention, which operate under the control of controller 140. As shown, communication device 100 includes microphone or receiving element 102 for receiving an audio signal including the user's speech and background noise. Communication device 100 further includes analog-to-digital converter (ADC) 105 that receives the audio signal from microphone 102 in analog form and generates digital real audio samples or real communication data. In addition, communication device 100 includes background effects data storage 110 for storing background effects data. Background effects data storage 110 may include various digitized audio clips that can be selected by the user for enhancing personal communication. For example, background effects data storage 110 may include digitized audio clips having romantic or soothing music, sounds of nature, heavy traffic, auditorium, party hall, machinery, noisy airport or market place, and so on.

Also, communication device 100 includes mixer 115, which can be a digital signal processor (DSP), for mixing a selected digitized audio clip from background effects data storage 110 with digital real audio samples from ADC 105. For example, the user of communication device 100 may be travelling from his office to the airport while on the phone and decide to have an unchanging background noise by selecting a soothing music to be played in the background. In such event, mixer 115 mixes the selected soothing music with the digital real audio samples from ADC 105 using mixing methods that are well known in the art, such that, for example, the selected soothing music is at a lower audible level than the digital real audio samples from ADC 105. As shown in FIG. 1, mixer 115 outputs the mixed digitized audio signal to coder 120 for processing, packetizing and transmitting over a communication line to the remote user or the listening party.

In one embodiment, communication device 100 optionally includes mixer 130 for mixing background effects data with the digital real audio samples from decoder 125 that receives packetized audio information over a communication line from the remote user and depacketizes the packetized audio information. Mixer 130 outputs the mixed digitized audio signal to digital-to-analog converter (DAC) 135 for generating an audio signal for playing by speaker or transmitting element 132. As a result of mixing background effects data with the digital real audio samples from decoder 125, the user of communication device 100 may also hear his selected soothing music in the background to have a sense for what the remote user or the listening party is hearing. In such embodiment, the user of communication device 100 may be able to selectively enable or disable mixer 115 and/or mixer 130.

In another embodiment of the present invention (not shown), communication device 100 may also include a video camera (or a receiving element) for capturing the user and his environment. Further, background effects data storage 110 may also include digitized image or video clips having romantic or soothing scenery, scenes of nature, sports, cartoons, airport or market place, and so on. In addition, in such embodiment, mixer 115 and mixer 130 can also mix a user selected digitized image or video clip with real digital samples (or real communication data) from the video camera for displaying the mixed clip on a display (or a transmitting element) of communication device 100 and/or a display of a remote communication device, respectively. Therefore, the invention of the present application is not limited to the particular embodiments described herein, but is capable of many rearrangements, modifications, and substitutions without departing from the scope of the invention.

Figure 2:
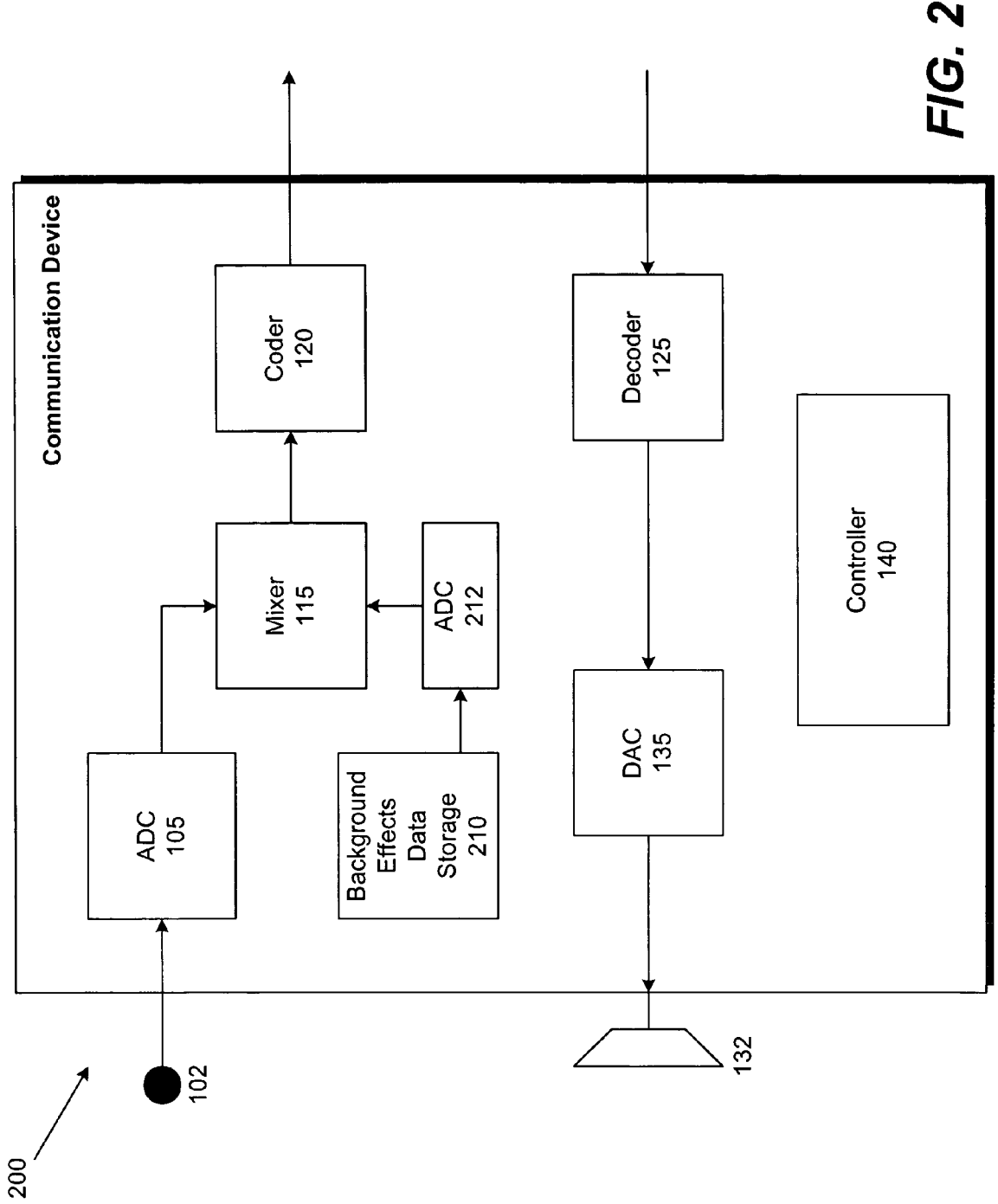
FIG. 2 is a block diagram illustrating various components of a communication device, according to another embodiment of the present invention.

Turning to FIG. 2, it illustrates another embodiment of the present invention, where like or corresponding elements among FIGS. 1 and 2 are indicated by like or corresponding reference numerals. As shown in FIG. 2, communication device 200 includes analog-to-digital converter (ADC) 212 for converting a user-selected analog audio (or video) clip stored in background effects data storage 210 to digital samples for use by mixer 115 (or mixer 135) to generate a mixed signal. This embodiment provides additional flexibility to users that may wish to download regular analog audio (or video) clip from the Internet for storage in background effects data storage 210 and use as background effects by communication device 100.

Figure 3:
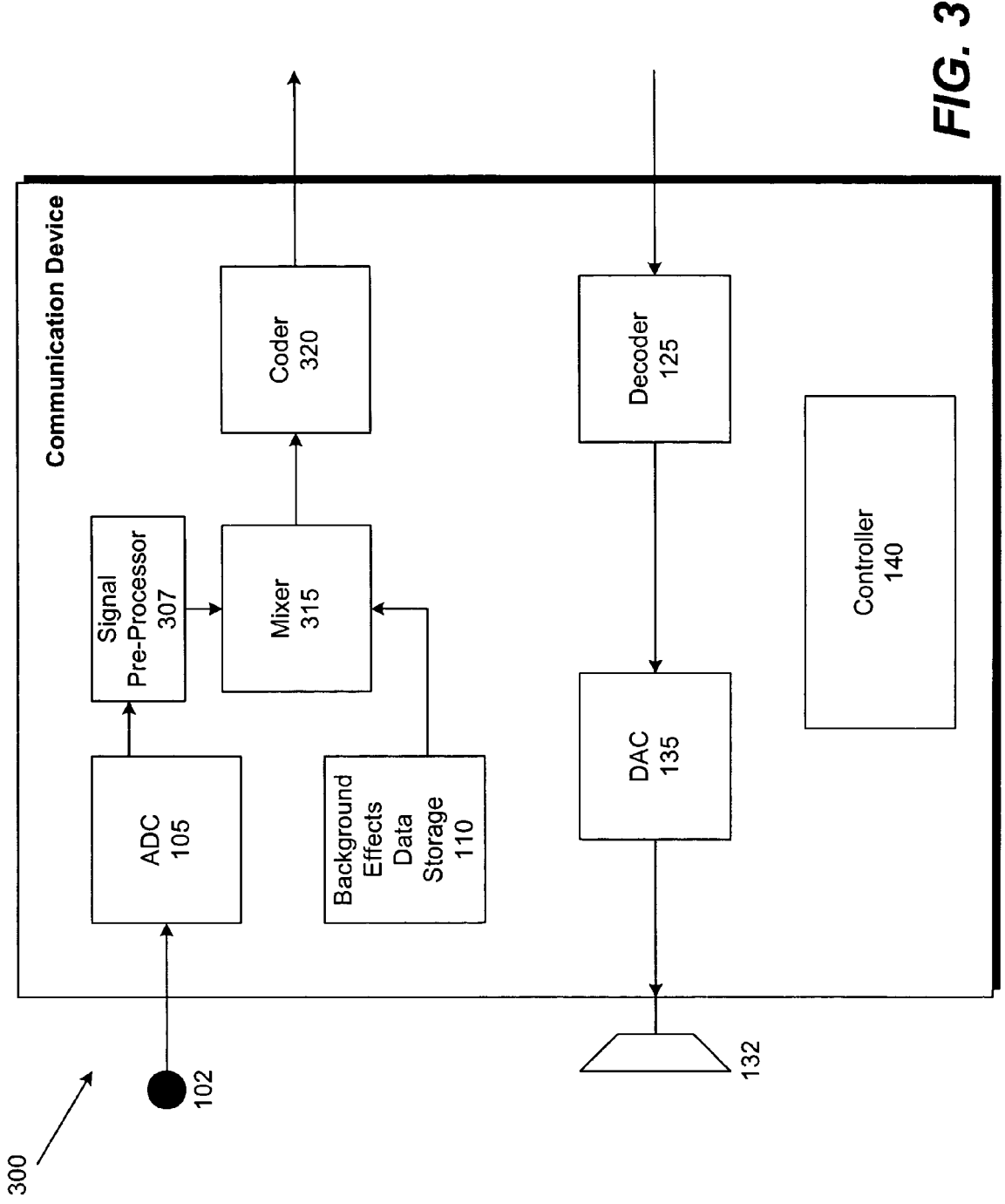
FIG. 3 is a block diagram illustrating various components of a communication device, according to yet another embodiment of the present invention.

FIG. 3 illustrates yet another embodiment of the present invention, where like or corresponding elements among FIGS. 1 and 3 are indicated by like or corresponding reference numerals. As shown in FIG. 3, communication device 300 includes signal pre-processor 307, which receives digitized samples from ADC 105 and can reduce speech (or video) artifacts or background noise in the digitized samples. Speech pre-processing methods, such as background noise reduction, are known in the art. In one embodiment, signal pre-processor 307 may also perform voice activity detection using the digitized samples prior to mixing the digitized samples with background effects data. In addition, signal pre-processor 307 may determine the desirable coding rate for coder 320 prior to mixing the digitized samples with background effects data.

Figure 4:
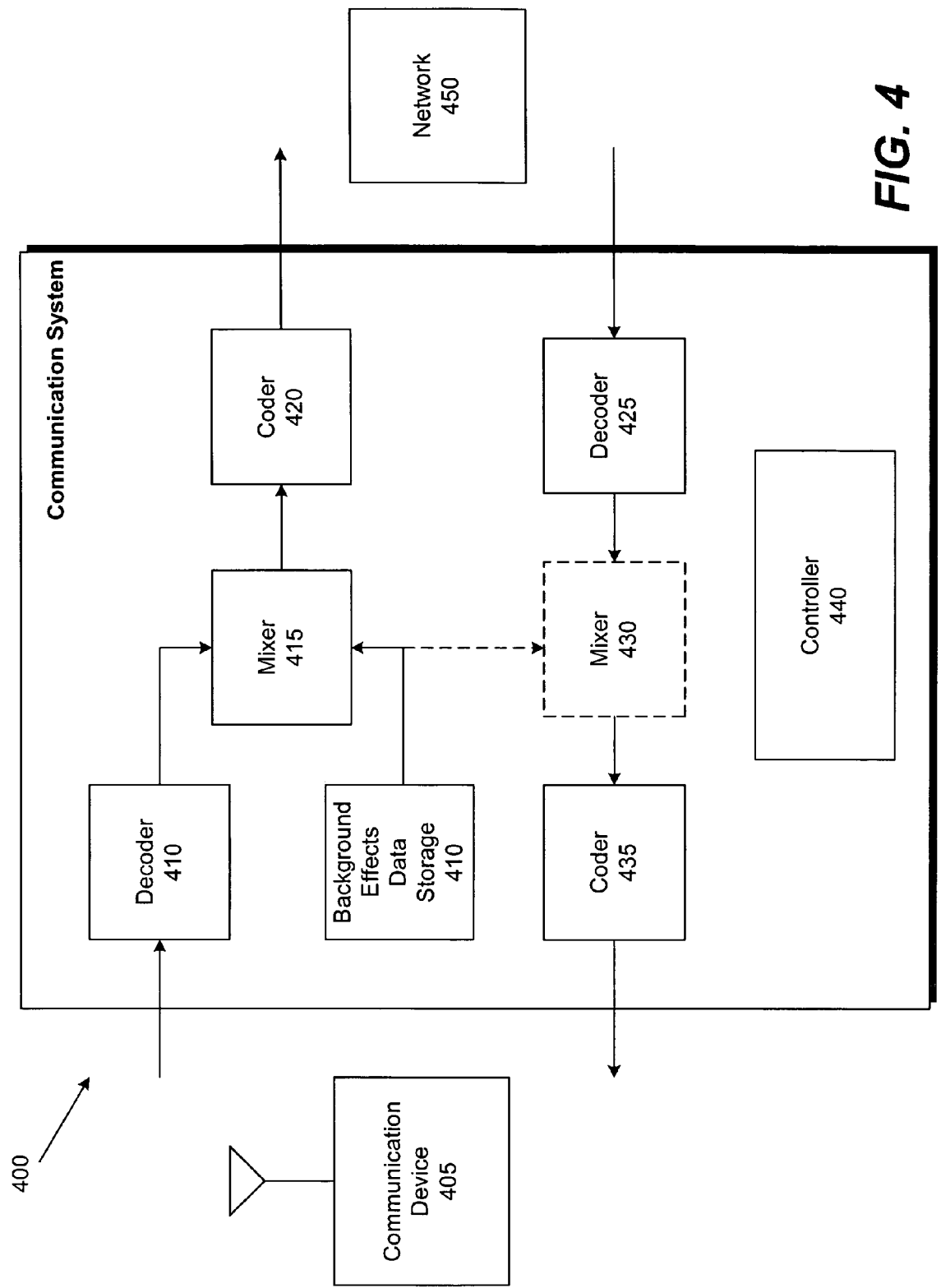
FIG. 4 is a block diagram illustrating various components of a communication system, according to one embodiment of the present invention.

FIG. 4 illustrates various components of communication system 400, according to another embodiment of the present application, which operate under the control of controller 440. In this embodiment, mixer 115, background effects data storage 110 and mixer 130 may be placed at the communication gateway or the telephone central office, such that the background sound effects can be mixed at the communication gateway or the telephone central office, e.g. by a service provider, rather than communication device 100. As shown in FIG. 4, communication system 400 includes decoder 410 for depacketizing packetized real communication data received over a first communication line from communication device 405, and for retrieving digitized real communication data. Further, communication system 400 includes background effects data storage 410 similar to background effects data storage 110 or 210. Communication system 400 also includes mixer 415 for mixing the digitized real communication data with the background effects data from background effects data storage 410 to generate enhanced data. Communication system 400 further includes coder 420 for packetizing the enhanced data to generate packetized data and for transmitting the packetized data over a second communication line to network 450.

In one embodiment, communication system 400 may also include an analog-to-digital converter (ADC) (not shown), which is configured to receive the background effects data and generate digitized effects data for use by mixer 415, similar to ADC 212 in FIG. 2.

As further shown in FIG. 4, communication system 400 may also include decoder 425 for depacketizing packetized real communication data received over the second communication line from network 450, and for retrieving digitized real communication data. Further, communication system 400 also includes mixer 430 for mixing the digitized real communication data with the background effects data from background effects data storage 410 to generate enhanced data. Communication system 400 also includes coder 435 for packetizing the enhanced data to generate packetized data and for transmitting the packetized data over the first communication line to communication device 405.

Figure 5:
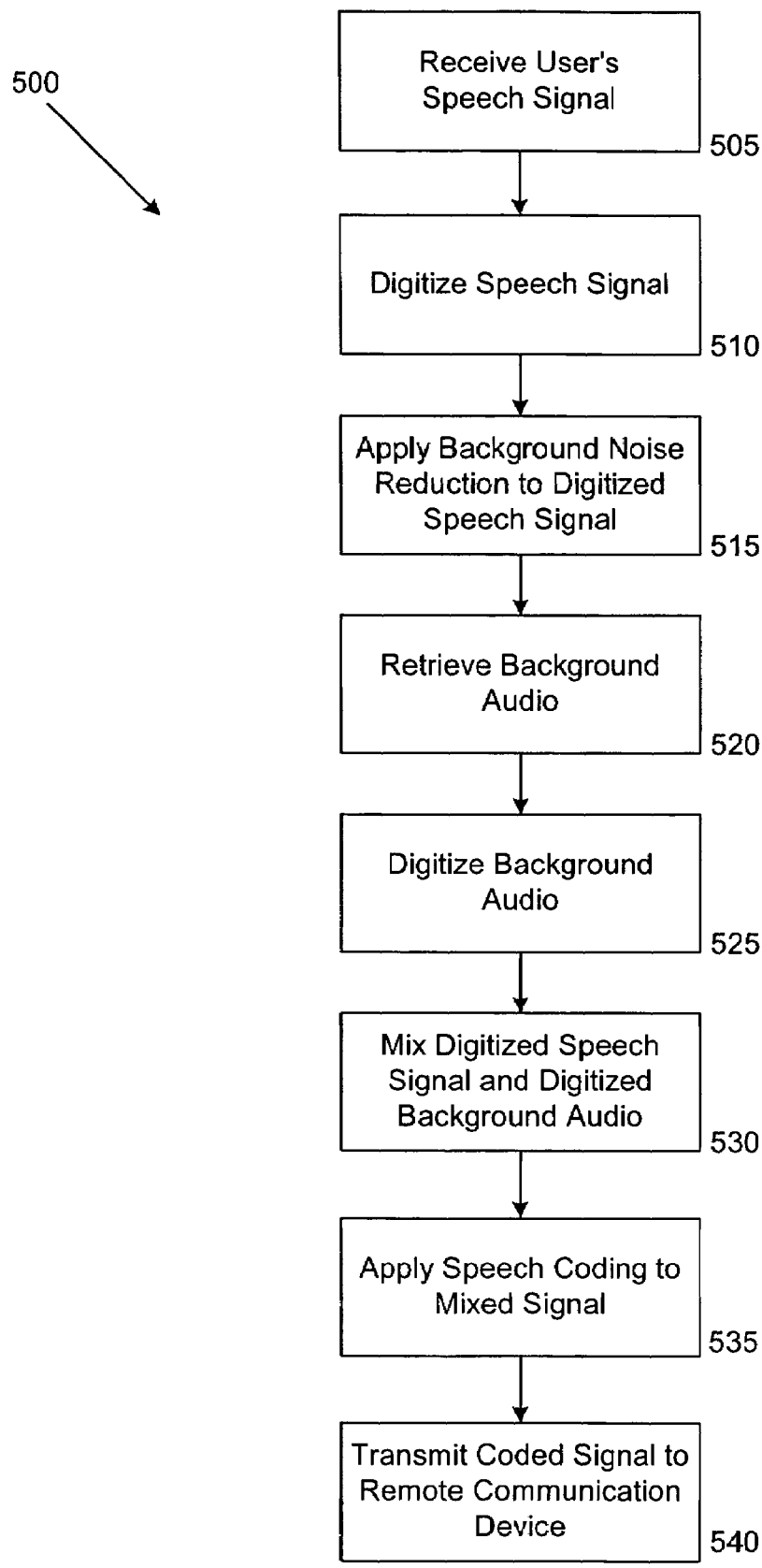
FIG. 5 is a flow diagram illustrating a communication process, according to one embodiment of the present invention.

Now, with reference to FIG. 5, background effects mixing method 500 is illustrated, according to one embodiment of the present invention. As shown, background effects mixing method 500 begins at step 505, where user's speech signal is received by microphone 102. Next, at step 510, user's speech signal is processed by ADC 105 to digitize user's speech signal and generate digitized real audio samples. As discussion above, background effects mixing method 500 may also include applying background noise reduction to digitized speech signal using signal pre-processor 307, at step 515. Further, at step 520, background effects audio data is retrieved from memory. If background effects audio data is not stored in digitized form in memory, at step 525, ADC 212 is used to generate digitized background effects. Next, at step 530, digitized real audio samples are mixed with digitized background effects to enhance personal communications. Thereafter, at step 535, the mixed digitized audio data may be coded based on a speech coding scheme and is packetized, and at step 540, the packetized data is transmitted to a remote communication device via a communication line. As discussed above, background effects data is not limited to audio signals, and a method similar to background effects mixing method 500 described above can be applied by the communication device to mix image or video clips with digitized real image or video captured by a camera of the communication device. In addition, background effects mixing method 500 may also be performed at a gateway device or a telephone central office. In one embodiment, the user may select the background effects prior to establishing a call or while the call is in progress, and may also select the background effects to be generated uni-directionally (to remote or to user) or bi-directionally (to remote and to user) from a database available in background effects data storage 110.

Thus, the above-described embodiments of the invention offer many advantages, such as simulation of an ambience by a user over mobile or telephone conversation or video to suit her mood; faking her whereabouts by generating background effects other than those in her present environment; or selecting background effects for her perception and/or remote user's perception.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A communication device for mixing effects data with real communication data, the communication device comprising:
   a receiving element configured to receive real communication data;
   a first analog-to-digital converter (ADC) configured to convert real communication data to digitized real communication data;
   an effects data storage containing the effects data;
   a first mixer configured to mix the digitized real communication data with the effects data and generate first enhanced data;
   a coder configured to code the first enhanced data using a coding scheme and packetize the coded first enhanced data to generate packetized data, and transmit the packetized data over a communication line;
   a decoder configured to depacketize communication data received over the communication line to generate depacketized communication data;
   a second mixer configured to mix the depacketized communication data with the effects data and generate second enhanced data;
   a digital-to-analog converter (DAC) configured to convert the second enhanced data to second analog enhanced data; and
   a transmitting element configured to play the second analog enhanced data.

2. A communication method for use by a communication device to mix effects data with real communication data, the communication method comprising:
   receiving real communication data;
   converting real communication data to digitized real communication data using a first analog-to-digital converter (ADC);
   mixing the digitized real communication data with the effects data to generate first enhanced data; and
   coding the first enhanced data using a coding scheme;
   packetizing the coded first enhanced data to generate packetized data;
   transmitting the packetized data over a communication line;
   depacketizing communication data received over the communication line to generate depacketized communication data;
   mixing the depacketized communication data with the effects data to generate second enhanced data;
   converting the second enhanced data to second analog enhanced data; and
   playing the second analog enhanced data.

* * * * *